US008259779B2

(12) United States Patent
Blanchard et al.

(10) Patent No.: US 8,259,779 B2
(45) Date of Patent: Sep. 4, 2012

(54) METHOD AND APPARATUS WITH NOTCHED TRANSMIT FREQUENCY BINS

(75) Inventors: Scott David Blanchard, Mesa, AZ (US); Randall K. Bahr, Scottsdale, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 938 days.

(21) Appl. No.: 12/331,208

(22) Filed: Dec. 9, 2008

(65) Prior Publication Data

US 2010/0142592 A1 Jun. 10, 2010

(51) Int. Cl.
*H04B 1/00* (2006.01)

(52) U.S. Cl. ........ 375/146; 332/107; 332/123; 332/159; 332/162; 375/254; 375/346; 375/E1.021

(58) Field of Classification Search .................... None
See application file for complete search history.

(56) References Cited

U.S. PATENT DOCUMENTS

| 5,612,978 A | 3/1997 | Blanchard et al. |
| 5,629,929 A | 5/1997 | Blanchard et al. |
| 5,640,385 A * | 6/1997 | Long et al. .................... 370/335 |
| 5,703,903 A | 12/1997 | Blanchard et al. |
| 5,852,418 A | 12/1998 | Ferrell et al. |
| 7,310,301 B1 | 12/2007 | Kleider et al. |
| 2010/0165956 A1 * | 7/2010 | Razzell .......................... 370/338 |
| 2011/0033000 A1 * | 2/2011 | Berens et al. ................. 375/260 |

OTHER PUBLICATIONS

Tanja Karp and N. J. Fliege, "Modified DFT Filter Banks with Perfect Reconstruction", IEEE Transactions on Circuits and Systems-II: Analog and Digital Signal Processing, vol. 46, No. 11, pp. 1404-1414, Nov. 1999.

\* cited by examiner

*Primary Examiner* — David C. Payne
*Assistant Examiner* — Adolf Dsouza
(74) *Attorney, Agent, or Firm* — Meschkow & Gresham, P.L.C.

(57) ABSTRACT

A wireless network (20) with at least a first radio communication unit (24) and a second radio communication unit (26) transmits and receives signals with minimal interference from the surrounding environment of the first unit (24) and second unit (26). The first radio communication unit (24) determines frequencies (54) having power level above a threshold (52), and creates a list of these frequencies (50) to be transmitted to the second radio communication unit (26). The second radio communication unit (26) places notches (140) in its transmission band (88) based on frequencies (54) in the list (50), reserved frequencies (132), and local frequencies (92) having signal energy above a threshold (90). When transmitting a signal (42), the second radio communication unit (26) avoids transmitting in frequencies that have notches (140).

21 Claims, 6 Drawing Sheets

METHOD AND APPARATUS WITH NOTCHED TRANSMIT FREQUENCY BINS

GOVERNMENT RIGHTS

This invention was made with Government support under N00039-04-C-2009 awarded by the Navy. The Government has certain rights in this invention.

TECHNICAL FIELD OF THE INVENTION

The present invention relates to the field of radio communication units. More specifically, the present invention relates to transmitters that adaptively select transmission spectra.

BACKGROUND OF THE INVENTION

As the number of radio communication units in use increases, the potential interference faced by each individual radio communication unit increases. As a result of this increase, there has grown a distinction between two different types of users of the frequency spectra: primary and secondary users. Primary users are licensed users of the frequency bandwidths. Traditionally, these devices are narrow band devices, modulating their transmission signals using a protocol such as Global System for Mobile communication (GSM) or a wide variety of other protocols where each transmission is confined within a narrow bandwidth within the frequency spectrum.

Secondary users follow protocols that ensure that their transmissions do not interfere with primary users. This responsibility of a secondary user to ensure that it does not interfere with primary users is traditionally referred to as the secondary user deferring to primary users of the spectra.

There is no requirement that the primary users refrain from interfering with secondary users. However, secondary users should assume that their transmissions will encounter interference from primary users. Traditionally, this interference has been mitigated once the signal is received at the receiver, through the use of filters. These filters reduce likely interfering signals while having minimal effect on desired signals. This interference, traditionally mitigated at the receiver, can arise from many different sources, including interference from radio communication devices near the transmitter.

Power consumption has also become a driving concern for many users. Handheld devices are becoming smaller with increasing functionality. Contemporary devices not only use battery power to make and receive phone calls, but also to run many different applications, ranging from games to business tools. As the sizes of the devices decrease, the dimensions available to store a battery in the device also decrease, requiring smaller batteries be used while still providing enough power to run the devices for a reasonable period of time.

In the situation of high interference levels, even though the receiver can receive a signal, and remove a large portion of the interference, the integrity of a bidirectional link may be compromised. Although traditional methods increase the likelihood of successful signal reception, the amount of processing and power used is significant.

In spread spectrum protocols, such as Code Division Multiple Access (CDMA), in order to reduce the effects of interference upon a signal, traditionally, a receiving device will pass the signal through a whitener. The whitener estimates the received signal's spectrum and normalizes the signal for further processing. This normalization procedure can be done in many different ways, including comparing the received signal to a reference signal having properties similar to that of the transmitted signal, or normalizing the power level of the received signal. Although this will increase the chance that a transmitted signal is successfully received by the receiver, the transmitter uses its power inefficiently. For example, the transmitter may expend power to transmit in the frequencies that the receiver will not detect due to interference.

The protocol of using a spread spectrum for transmission can avoid significant interference from conventional narrow band sources, as the signal is being spread over a wider bandwidth. This is because the bulk of the signal may still be successfully recovered from frequencies having minimal interference, rather than relying on frequencies that may be too noisy to demodulate. Although this protocol can help tolerate significant interference, the interference-free portion of the spread-spectrum bandwidth decreases with the increase of interfering transmitting devices, making reception more difficult. Traditionally, in order to compensate for this interference, the transmitting device would increase the power used to transmit the signal.

Specifically in the situation of secondary users deferring to primary users, increasing the power not only increases the amount of power inefficiently used in the communication system, it also increases the likelihood that the transmission from the secondary user will interfere with communication by the primary user. As a result, these users traditionally have had to rely upon the ability of whiteners and filters at the receiving device in order to demodulate a signal successfully.

These concerns will only increase as more devices are used, not only in the private sector, but also in governmental, military and other specialized sectors.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
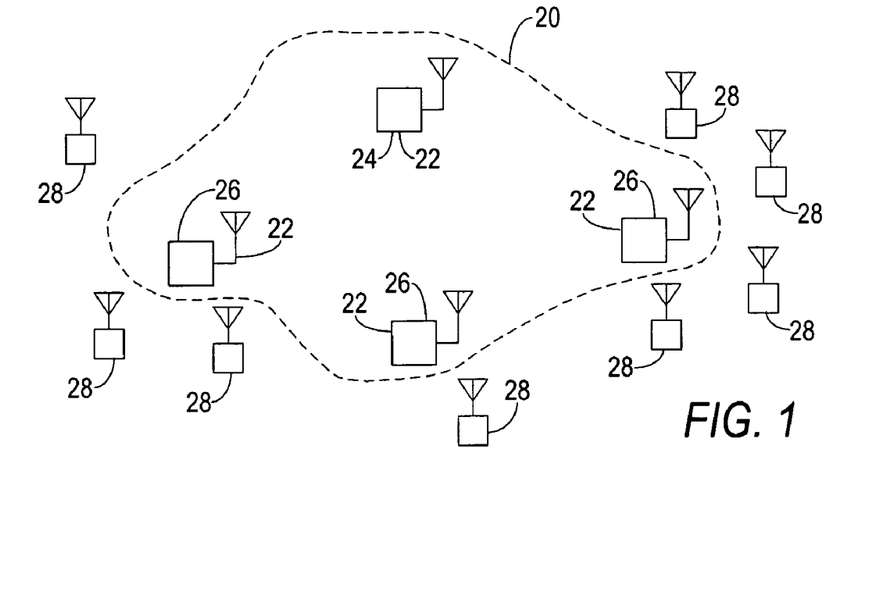
FIG. 1 shows a simplified diagram of radio communication units together in a network in accordance with a preferred embodiment of the present invention.

FIG. 1 shows a simplified wireless network 20 of radio communication units 22. In network 20, there is one radio communication unit 22 designated as a first radio communication unit 24, and at least one radio communication unit 22 designated as a second radio communication unit 26. There may be more than one second radio communication unit 26 in network 20 communicating with first radio communication unit 24. In one embodiment of network 20, first radio communication unit 24 is a base station, and second radio communication unit 26 is a subscriber unit. In another embodiment, both first radio communication unit 24 and second radio communication unit 26 are subscriber units. In still another embodiment, first radio communication unit 24 is an earth-orbiting satellite or a terrestrial gateway that communicates through a satellite and second radio communication unit 26 is a subscriber unit that communicates directly with the satellite. In such an embodiment, network 20 is configured to follow protocols associated with the Mobile User Objective System (MUOS). For ease of explanation, first radio communication unit 24 is treated as a receiving radio communication unit, and second radio communication unit 26 is treated as a transmitting radio communication unit but either radio communication unit 22 may serve as the receiving or transmitting radio communication unit.

Radio communication units 22, whether first radio communication unit 24 or second radio communication unit 26, rarely function in an isolated environment. It is likely there will be other radio communication devices 28 transmitting or receiving signals using frequencies that either first radio communication unit 24 or second radio communication unit 26 are using to transmit or receive signals. Other radio communication devices 28 are other wireless devices that are physically in proximity to either first radio communication unit 24 or second radio communication unit 26 such that communication to and from other radio communication devices 28 can interfere with communication between first radio communication unit 24 and second radio communication unit 26. Also, other radio communication devices 28 are not part of network 20. Thus, other radio communication devices 28 are not transmitting signals intended to be received at first radio communication unit 24. Furthermore, other devices 28 may be using different protocols, such as GSM, than first radio communication unit 24 and second radio communication unit 26. Therefore, other devices 28 may be utilizing only a small portion of transmit and receive bands that are being used by network 20.

Interference from other devices 28 can result in first radio communication unit 24 being unable to successfully receive a communication intended to be received by it. The interference associated with other devices 28 may vary frequently as devices enter and leave the locality of either first radio communication unit 24 or second radio communication unit 26. Similarly, in the instance that either first radio communication unit 24 and/or second radio communication unit 26 is moving, this movement may change the interference pattern as surrounding devices 28 change.

Specifically when first radio communication unit 24 and second radio communication unit 26 are secondary users of a spectrum, and other devices 28 are primary users of the same spectrum, first radio communication unit 24 and second radio communication unit 26 should be careful not to interfere with other devices 28. As secondary users, first radio communication unit 24 and second radio communication unit 26 are typically required to defer to primary users while transmitting and receiving signals.

Figure 2:
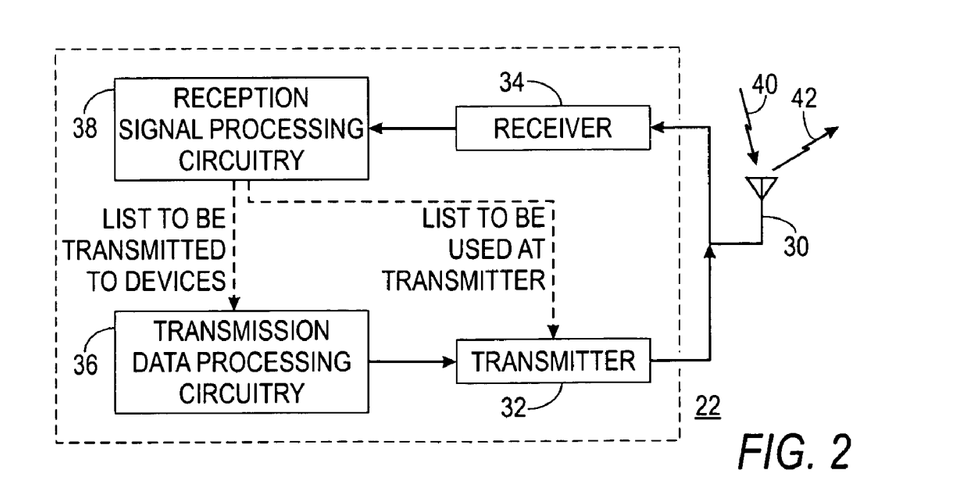
FIG. 2 shows a simplified block diagram of a radio communication unit in a preferred embodiment of the present invention.

FIG. 2 shows a simplified block diagram of radio communication unit 22. Radio communication unit 22 is capable of both transmission and reception from other radio communication units 22 in wireless network 20 (FIG. 1). Radio communication unit 22 is capable of functioning as either first radio communication unit 24 or as second radio communication unit 26. In order to transmit and receive signals, radio communication unit 22 has an antenna 30, a transmitter 32, a receiver 34, transmission data processing circuitry 36 and reception signal processing circuitry 38. Antenna 30 is configured to both transmit and receive wireless signals. When radio communication unit 22 is receiving a signal 40, signal 40 is received by antenna 30, and sent to receiver 34. Once receiver 34 has completed initial processing of signal 40, the signal is passed to reception signal processing circuitry 38 for further filtering, down conversion, demodulation, and any other processing that may be desirable.

When radio communication unit 22 is transmitting a signal 42, a signal 44 is generated in transmission data processing circuitry 36 and passed to transmitter 32. Transmitter 32 processes the signal through modulation, power adjustment, and any other desirable processing prior to transmission. Once transmitter 32 has completed processing signal 44, the output from transmitter 32, signal 42, is passed to antenna 30 for wireless transmission.

Although transmission data processing circuitry 36 and reception processing circuitry 38 are shown as two distinct sets of circuitry, it is not necessary that the circuitry be separated. Both transmission data processing circuitry 36 and reception processing circuitry 38 may be combined into one set of circuitry, such as a digital signal processor (DSP) or other similar processing device.

Figures 3, 10:
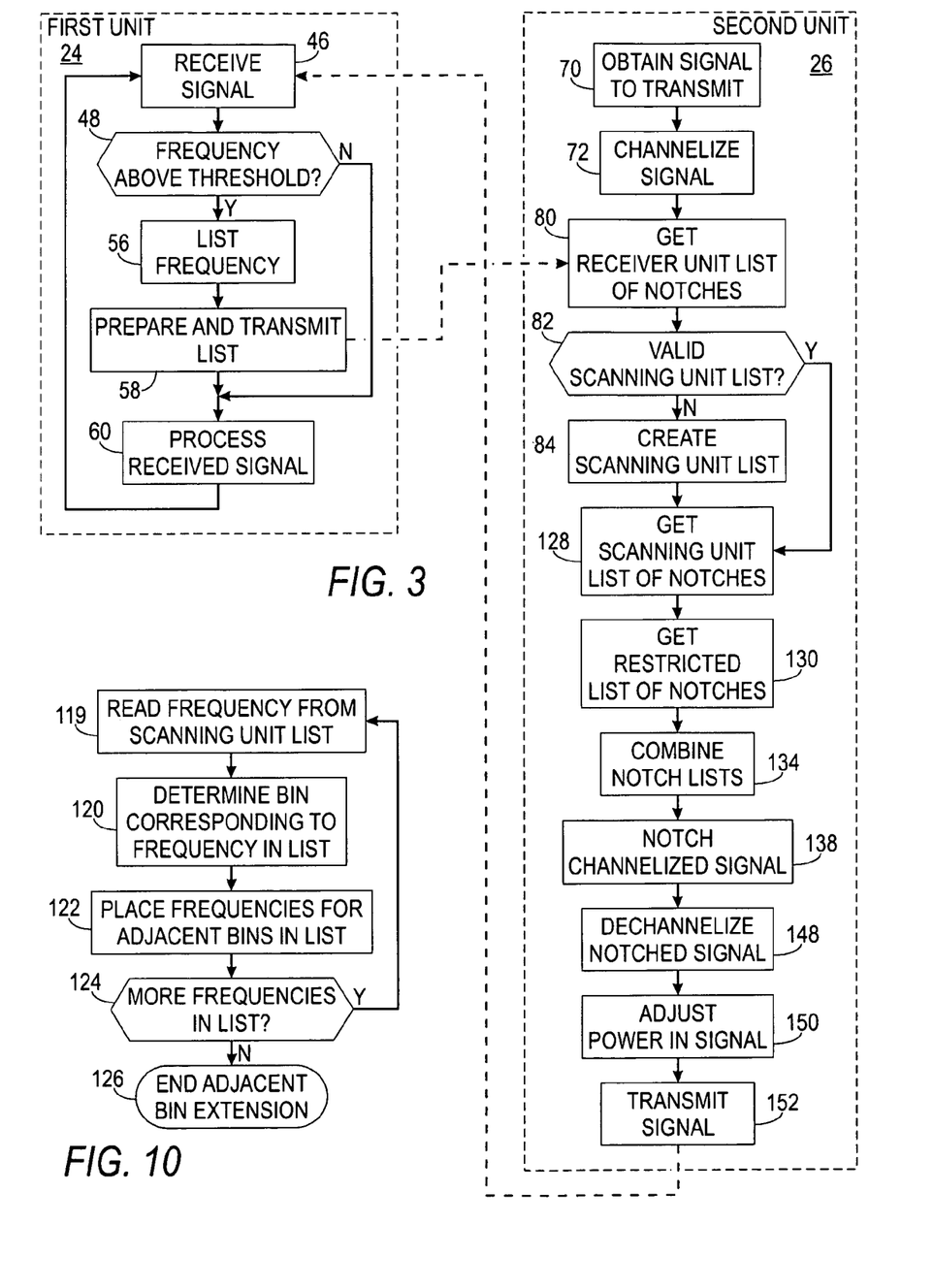
FIG. 3 shows a simplified flow chart of a notching process within a network in accordance with a preferred embodiment of the present invention.
FIG. 10 shows a simplified flow chart of a process to include frequencies corresponding to adjacent frequency bins in a list of frequencies in accordance with a preferred embodiment of the present invention.

FIG. 3 shows a simplified flow chart of communications between first radio communication unit 24 and second radio communication unit 26 in network 20. Communications depicted in the flow chart of FIG. 3 between first radio communication unit 24 and second radio communication unit 26 generally occur after network 20 is established between first radio communication unit 24 and second radio communication unit 26. Although first radio communication unit 24 and second radio communication unit 26 may be performing tasks mentioned in FIG. 3 simultaneously, for ease of explanation, the tasks associated with first radio communication unit 24 will be described first, followed by a description of tasks performed by second radio communication unit 26.

First radio communication unit 24 commences processing communications between itself and second radio communication unit 26 by performing a task 46. In task 46, antenna 30 (FIG. 2) of first radio communication unit 24 receives wireless signal 40 (FIG. 2). Prior to passing signal 40 to reception signal processing circuitry 38 for processing, receiver 34 will perform some initial processing to reduce the interference in signal 40. Once interference is reduced, signal 40 is used in a query task 48 to determine whether any frequencies have too much interference.

Figure 4:
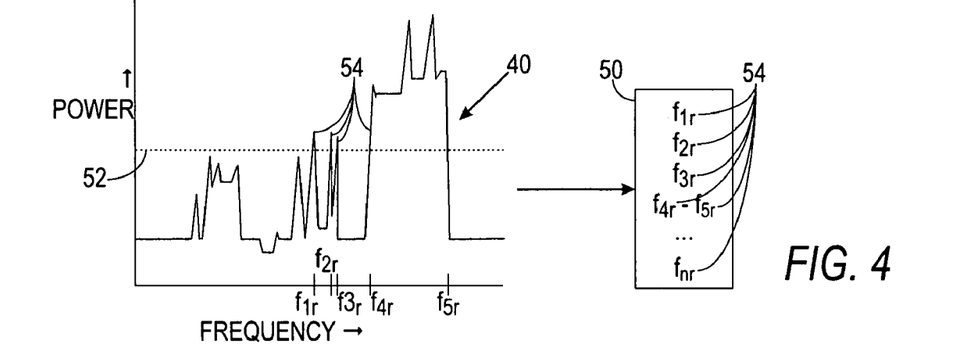
FIG. 4 graphically shows a sample signal received by a receiver with an associated notch list in accordance with a preferred embodiment of the present invention.

FIG. 4 shows a sample signal 40 that might be received by radio communication unit 22, and a receiving unit list 50. Signal 40 may have differing power levels at different frequencies. The presence of power peaks at various frequencies may be due to interference from other signals being transmitted by other devices 28 (FIG. 1). If interference is present, signal 40 will have a peak showing the heightened power at that specific frequency. To determine whether or not these frequencies have sufficient power to increase the processing required to successfully receive a signal, receiver (FIG. 2) at first radio communication unit 24 compares signal 40 with a preset power threshold 52. Power threshold 52 is set such that it will detect power levels that are high enough to significantly interfere with communications of network 20.

Returning to FIG. 3, once query task 48 has determined that there are frequencies 54 that have power levels above power threshold 52, first radio communication unit 24 performs a task 56. In this task, the frequencies 54 that were determined earlier as having power levels above power threshold 52 are placed in list 50 (FIG. 4). Alternatively, if radio communication device 22 is aware how other devices will process list 50, the frequencies can be indicated in a number of other methods. In one alternate embodiment, list 50 is populated by frequency bin numbers corresponding to Fourier Transform operations carried out in radio communication units 24 and/or 26. List 50 is used to convey the information regarding frequencies 54 to any radio communication unit 22 that may benefit from information of potential interference encountered by first radio communication unit 24. This information can be then used by other devices to refrain from transmitting in those frequencies where the power level is "high". This will reduce the amount of power that is used to transmit in these frequencies where it is unlikely that first radio communication unit 24 will be able to successfully extract useful information from signal 40.

Once receiving unit list 50 is populated with all frequencies 54, a task 58 prepares and transmits receiving unit list 50. To prepare receiving unit list 50, receiver 34 (FIG. 2) may provide list 50 to reception signal processing circuitry (FIG. 2) to store receiving unit list 50 in memory. List 50 may then be accessed by transmission data processing circuitry 36 (FIG. 2) for processing prior to transmission to second radio communication unit 26. When transmitting receiving unit list 50, transmission data processing circuitry 36 provides list 50 to transmitter 32 (FIG. 2) which may further process the signal used to transmit list 50 prior to sending list 50 to antenna 30 (FIG. 2) for wireless transmission. In one embodiment, the fraction of time that signal 49 exceeds power threshold 52 over a preset time is compared to a preset duty cycle threshold. The preset duty cycle threshold and the preset time are based upon the rate that receiving unit list 50 is computed. This rate is adjusted to achieve the desired overhead in the communications system and desired latency in transmission.

After receiving unit list 50 is provided to transmission data processing circuitry 36 (FIG. 2), a task 60 performs any processing on signal 40 that is desirable. This further processing occurs within reception signal processing circuitry 38. Although FIG. 3 shows task 60 performed subsequent to task 58, it should be noted that these tasks may also be performed simultaneously. Once task 60 is completed, first radio communication unit 24 will perform, repeat, continue or resume task 46, receiving signal 40.

Figure 5:
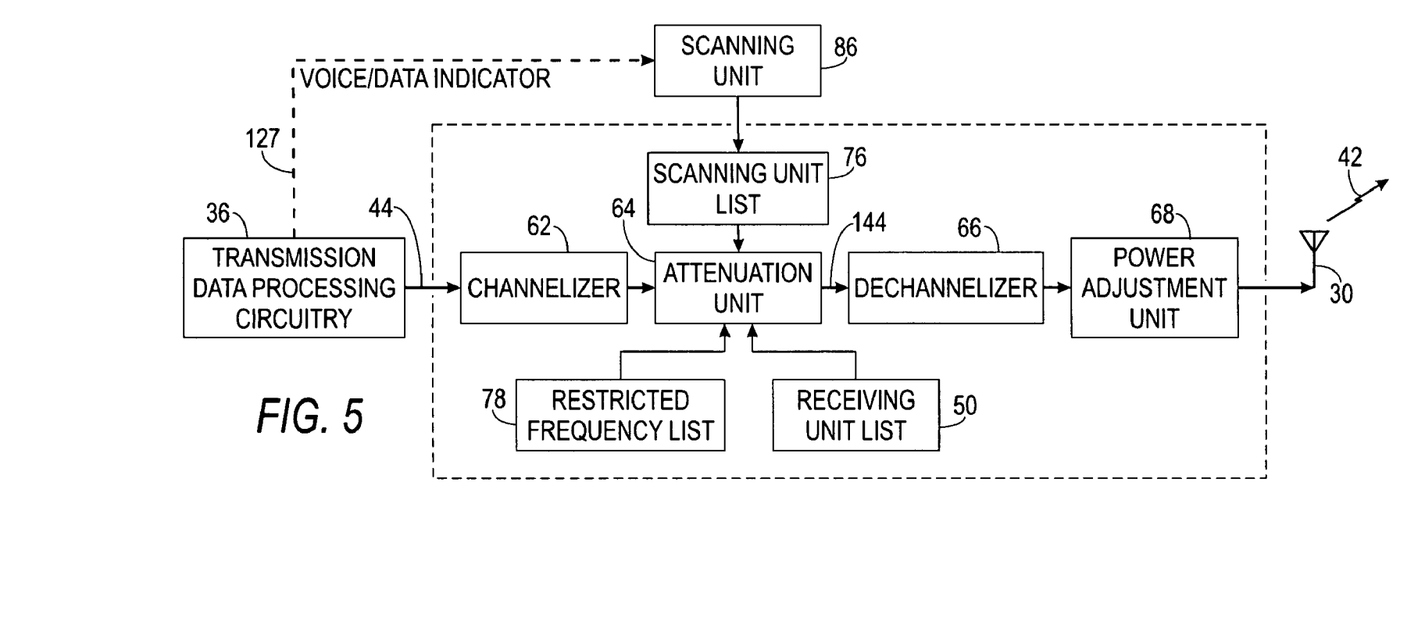
FIG. 5 shows a simplified block diagram of a transmitter within a radio communication unit in accordance with a preferred embodiment of the present invention.

FIG. 5 is a simplified block diagram of transmitter 32 in second radio communication unit 26. The frequencies used to transmit a signal from second radio communication unit 26 are determined from the protocol that second radio communication unit 26 uses to communicate with first radio communication unit 24. Examples of these protocols include Orthogonal Frequency-Division Multiplexing (OFDM), Mobile User Objective System (MUOS), CDMA and the like. Each of these protocols have different methods of modulating the signal, for example, some use unique codes for each device to modulate the transmitted signal (CDMA), some others use orthogonal sub-frequencies to transmit (OFDM).

Transmitter 32 receives signal 44 from transmission data processing circuitry 36 and further modulates it to be transmitted based upon the protocol required prior to sending the signal to antenna 30. Prior to being accepted by transmitter 32, signal 44 may have been modulated to convey information and may have been further processed, such as by code modulation for CDMA or Direct-Sequence Spread Spectrum (DSSS) systems. Signal 44 may also have been pulse filtered. Transmitter 32 is made up of a channelizer 62, an attenuation unit 64, a dechannelizer 66, and a power adjustment unit 68. Channelizer 62 accepts as an input a time-domain signal and outputs a set of frequency bins corresponding to frequencies used to transmit a communication signal. In one embodiment, channelizer 62 is implemented using a poly-phase filter. Attenuation unit 64 accepts the set of frequency bins from channelizer 62 and places notches in selected bins to reduce the impact of interference the transmitted signal may encounter prior to reception. Dechannelizer 66 takes the set of frequency bins, and reconstructs a time-domain signal from the bins. Power adjustment unit 68 adjusts the overall power level in the signal prior to transmission. Up conversion and RF power amplification (not shown) may take place after power adjustment unit 68.

Returning to FIG. 3, second radio communication unit 26 obtains signal 44 (FIG. 2) from its transmission data processing circuitry 36 (FIG. 2) in a task 70. Signal 44 may have undergone initial processing and modulation in transmission data processing circuitry 36 prior to passing signal 44 to transmitter 32. Thus, signal 44 has already been properly modulated to be transmitted in the appropriate protocol, OFDM, DSSS, etc.

Next, a task 72 is performed once transmitter 32 (FIG. 1) in second radio communication unit 26 obtains signal 44 from transmission data processing circuitry 36. This task is performed in channelizer 62 (FIG. 5). Channelizer 62 takes signal 44 and converts it from a time-domain signal to a frequency-domain signal using conventional Fourier Transformation techniques. This conversion divides the signal into different frequency bins 74, and frequency bins 74 are passed to attenuation unit 64.

Figure 6:
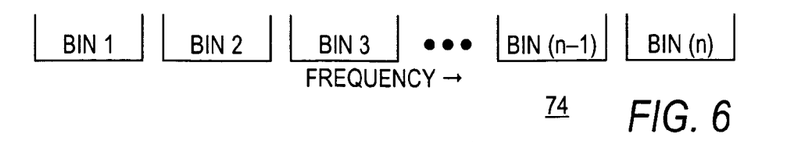
FIG. 6 shows a graph of frequency bins in accordance with a preferred embodiment of the present invention.

FIG. 6 shows a sample of frequency bins 74. The number of frequency bins 74 is dependent upon a number of factors, including the range of frequencies that radio communication unit 22 (FIG. 2) may potentially use, and the range of frequencies radio communication unit 22 may allocate to a single frequency bin 74. Each frequency bin 74 will be allocated a certain range of frequencies, and channelizer 62 (FIG. 5) will place the portion of signal energy in the frequency-domain signal that falls within that range inside the proper frequency bin 74. Once channelizer 62 has completed dividing the frequency-domain signal, frequency bins 74 are provided as an input to attenuation unit 64 (FIG. 5) for further processing.

In order to modify signal 44 so that potential interference is minimized, attenuation unit 64 (FIG. 5) uses three different sets of information, receiving unit list 50 (FIG. 5), a scanning unit list 76 (FIG. 5), and a restricted frequency list 78 (FIG. 5). Each of these lists is obtained from different sources, and is stored in memory within transmitter 32, and is accessible by attenuation unit 64.

After task 72, second radio communication unit 26 performs a task 80 by receiving receiver unit list 50. Receiving unit list 50 (FIG. 4) is transmitted from first radio communication unit 24, when first unit performs task 58, and is wirelessly received by second radio communication unit 26 in task 80. Receiving unit list 50 contains information regarding frequencies 54 (FIG. 4) having power levels above a power threshold 52 (FIG. 4) at first radio communication unit 24.

Because second radio communication unit 26 may be surrounded by other devices 28, and because the interference patterns created by these devices 28 is rarely static, and existing scanning unit list 76 may be a stale representation of potential interference near second radio communication unit 26. To ensure that scanning unit list 76 represents the current environment for potential interference local to second radio communication unit 26, a query task 82 determines whether scanning unit list 76 is valid. The validity of scanning unit list 76 validity may be based on a variety of factors, such as elapsed time since the last scan was made, whether second radio communication unit 26 has received a request to transmit, and whether there is a current opportunity to scan.

Unlike receiving unit list 50 which is received by second radio communication unit 26, scanning unit list 76 (FIG. 5) is created locally at second radio communication unit 26. Similar to receiving unit list 50 which lists frequencies 54 that have a power level above a preset threshold 52, scanning unit list 76 lists frequencies that have signal energy above a preset threshold. Thus, receiving unit list 50 is used to preemptively counteract potential interference at first radio communication unit 24, and scanning unit list 76 is used to prevent second radio communication unit 26 from transmitting in frequencies where it may cause interference for other devices 28 (FIG. 1) that may be nearby.

If scanning unit list 76 (FIG. 5) is not valid, a task 84 creates a new scanning unit list 76 that represents the potential interference local to second radio communication unit 26. Task 84 is performed by scanning unit 86 (FIG. 5).

Second radio communication unit 26, when transmitting signal 44, will use a transmission band (discussed below) to facilitate the wireless communication of signal 44 (FIG. 5). This transmission band may be shared with other devices 28 (FIG. 1). If second radio communication unit 26 transmits in frequencies that other devices 28 use to transmit signals, there is a chance that the signal transmitted by second radio communication unit 26 may not be successfully received by first radio communication unit 24. Here, the term "successfully received" is the successful demodulation and recovery of a signal where first radio communication unit 24 is able to understand the communication from second radio communication unit 26. Traditionally, to counteract this potential interference concern, second radio communication unit 26 would increase the power used to transmit signal 44, thus possibly drowning out the interfering signals, but increasing the likelihood of successful reception at first radio communication unit 24. With the use of scanning unit list 76, second radio communication unit 26 is more aware of frequencies that have a higher likelihood of interference, and can refrain from transmitting in those frequencies, thus reducing the amount of power needed along with the interference it imposes on other devices 28.

Figure 7:
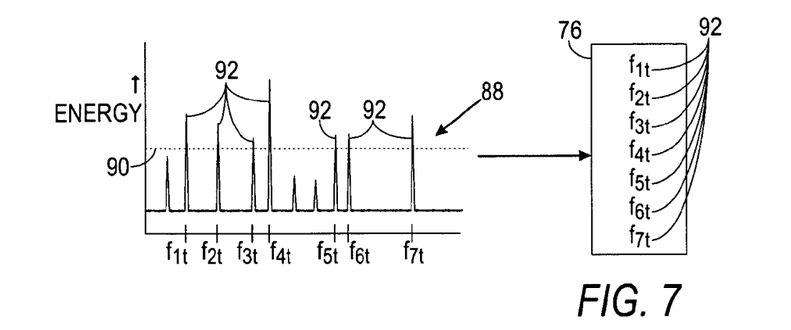
FIG. 7 graphically shows a sample transmission band interference pattern with an associated notch list in accordance with a preferred embodiment of the present invention.

FIG. 7 shows a transmission band 88 with a sample interference pattern, and scanning unit list 76. Transmission band 88 may have differing signal energy levels at different frequencies. The presence of signal energy peaks at various frequencies may be due to signals from other nearby radio communication devices. If such signal energy is present, transmission band 88 will have a peak showing the heightened signal energy at that specific frequency. To determine whether or not these frequencies have sufficient signal energy to disrupt a signal transmitted by second radio communication device 26 and vice versa, scanning unit 86 compares transmission band 88 with a preset threshold 90.

To create scanning unit list 76 (FIG. 5), scanning unit 86 scans transmission band 88 (FIG. 7) and determines which frequencies 92 (FIG. 7) have "high" signal energy. In one embodiment, scanning unit 86 is external to transmitter 32 (FIG. 2). In such situations, scanning unit 86 may be included as part of receiver 34 (FIG. 2), or as a separate unit. In an alternative embodiment, scanning unit 86 may be incorporated as part of transmitter 32.

Figure 8:
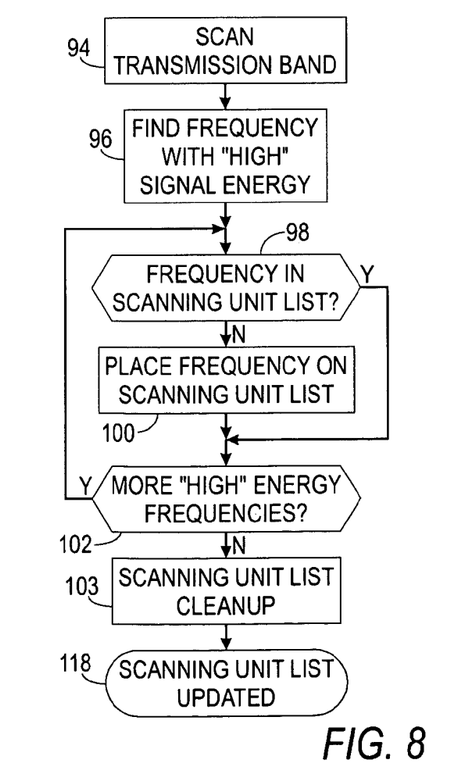
FIG. 8 shows a simplified flow chart of a process to create a scanning unit list in accordance with a preferred embodiment of the present invention.

FIG. 8 shows a simplified flow chart of a process scanning unit 86 (FIG. 5) may use to create scanning unit list 76 (FIG. 7). Scanning unit 86 must first perform a task 94, scanning transmission band 88 (FIG. 7). Task 94 is preferably performed when second radio communication unit 26 (FIG. 2) is not transmitting any signal, as the transmitted signal would likely overpower the scan of transmission band 88 that scanning unit 86 is performing. Task 94 takes time that could be otherwise used for transmission or reception of wireless signals. It is because of these limitations that task 82 first determines whether scanned unit list 76 must be created, or if it is a valid list.

Scanning unit 86 (FIG. 5) may be able to scan transmission band 88 at the same time that second radio communication unit 26 receives a signal. In order to do this, either scanning unit 86 is configured as a unit separate from receiver 34 (FIG. 1), or receiver 34 in second radio communication unit 26 is configured to receive signals in both its transmit and receive bands, which may be the same.

After scanning transmission band 88 (FIG. 7), scanning unit 86 (FIG. 5) performs a task 96 in which frequencies 92 are found by comparing the signal energy levels found in transmission band 88 against signal energy threshold (FIG. 7). It should be noted that task 96 may include a filtering function such that frequencies are not included in response to noise or anomalous events. A query task 98 then determines if a frequency 92 (FIG. 7) determined to have "high" signal energy is currently in scanning unit list 76 (FIG. 7). If the frequency 92 is not in scanning unit list 76, task 100 will cause the frequency 92 to be placed in scanning unit list 76. If the answer to query task 98 is "yes", scanning unit 86 will determine if there are any more frequencies 92 having "high" signal energy. If there are, flow will return to query task 98. If the answer to query task 102 is "no", scanning unit list 76 has been updated to include all new frequencies that have signal energy levels that exceed signal energy threshold 90, and a task 103 will clean up scanning unit list.

Figure 9:
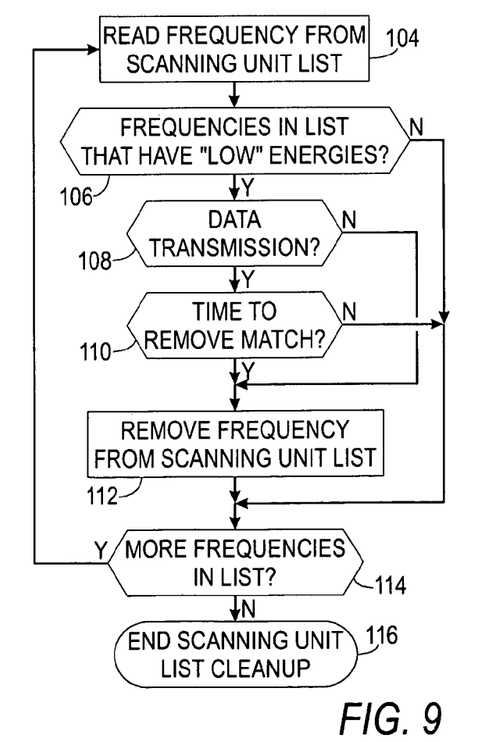
FIG. 9 shows a simplified flow chart for determining whether a frequency should remain in a list of frequencies in accordance with a preferred embodiment of the present invention.

FIG. 9 shows a simplified flow chart of an exemplary process scanning unit 86 may follow to clean scanning unit list 76. When task 103 is called, this process beings with a task 104 in which a frequency 92 is read from scanning unit list 76 (FIG. 7). A query task 106 will then determine whether the frequency 92 (FIG. 7) currently has signal energy levels below signal energy threshold 90. If the signal energy level is below signal energy threshold 90, then a query task 108 will determine if the signal is a data transmission.

Second radio communication unit 26 is aware of whether it is transmitting a data or voice signal. In one embodiment, this is done through the use of voice/data indicator 127 (FIG. 5). Voice/data indicator 127 will indicate to scanning unit 86 the nature (voice or data) of signal 44 transmitter 32 is preparing to transmit. This information is used to determine the time period for which any frequency will remain in scanning unit list 76 (FIG. 7) after the signal energy level falls below signal energy threshold 90 (FIG. 7).

In the case of data transmission, each packet transmitted may only take a very short period of time; however completion of an entire transmission may take a large number of separate packet transmissions, thus taking an extended period of time. In this situation, it is impractical to scan prior to each data packet transmission, as it would take time to conduct the scan and recreate scanning unit list 76 prior to each individual packet transmission. Furthermore, there is a chance that although for a scan in between transmissions a frequency may have a signal energy that falls below signal energy threshold 90 the frequency may still be in use and the low signal energy level may be a momentary lull in the interference at that frequency. In order to prevent potential interference that may arise soon after the scan from interfering with the transmission of data packets, while also reducing the number of scans that must be completed, scanning unit 86 will keep frequency 92 in scanning unit list 76 for a period of time after frequency's 92 signal energy level drops below signal energy threshold 90.

In the case of voice communication, transmissions are more likely to be extended periods of transmission followed by extended periods of no transmission, unlike the multiple short bursts of data transmission. For voice communications, scanning unit 86 can scan transmission band 38 just prior to each transmission, as any delay that may be imposed by scanning unit's 86 activity is unlikely to be noticeable in normal conversation. As a result, for voice communication, if the signal energy level of frequency 92 (FIG. 7) which was previously present in scanning unit list 76 (FIG. 7) drops below signal energy threshold 90 (FIG. 7), frequency 92 is immediately removed from scanning unit list 76, without waiting for some time.

If signal 44 is data, then a query task 110 will determine whether a predetermined duration of time has passed, and if it is time to remove frequency 92 from scanning unit list 76. If the predetermined duration has passed, then a task 112 removes frequency 92 from scanning unit list 76. A query task 114 then determines if there are any more frequencies 92 in scanning unit list 76.

In the situation where query task 106 determines that frequency 92 (FIG. 7) continues to have signal energy levels above signal energy threshold 90, query task 114 is called. Similarly, from query task 110, if sufficient time has not passed to remove frequency 92 from scanning unit list 76, query task 114 is called. Once query task 114 determines that there are no more frequencies 92 in scanning unit list 76, task 116 terminates the scanning unit list cleanup process.

Returning to FIG. 8, after task 103 has completed cleaning scanning unit list 76, a task 118 will cause the scan transmission band process to terminate.

As scanning unit 86 (FIG. 8) is aware of the frequency ranges of frequency bins 74 (FIG. 9) within attenuation unit 64 (FIG. 5), scanning unit list 76 (FIG. 7) may be populated with frequencies or with bin numbers, or any other information that will notify attenuation unit 64 of frequencies 92 (FIG. 4).

FIG. 10 shows one embodiment of the invention in which scanning unit 86 (FIG. 5) includes frequencies that occupy frequency bins adjacent to those that correspond to frequencies 92 (FIG. 7) with "high" signal energy. Prior to extending the frequency ranges in scanning unit list 76 (FIG. 7) to include adjacent frequency bins, scanning unit 86 has completed task 118 (FIG. 8), and scanning unit list 76 has been updated to include frequencies that currently have signal energy levels higher than signal energy threshold 90 (FIG. 7). Signal energy threshold 90 is at a level such that frequencies that may cause severe interference are flagged, while those that may not cause such interference are not affected. However, if such "high" signal energy levels are encountered, it is likely that surrounding frequencies also have significant interference, although not sufficient to reach signal energy threshold 90. Furthermore, in the event that second radio communication unit 26 is a secondary user, it has a duty to refrain from interfering with primary users. In order to avoid transmitting in frequencies in close proximity to frequency 92, second radio communication unit 26 is configured to include frequencies that correspond to adjacent frequency bins in frequency bins 74 in scanning unit list 76.

Task 119 begins the process of extending the frequency ranges found in scanning unit list 76. In task 119, a frequency is read from scanning unit list 76. Then, a task 120 takes this frequency and determines which bin in frequency bins 74 (FIG. 6) corresponds to frequency 92 (FIG. 7) that was read from scanning unit list 76. After the bin number is determined, a task 122 will determine frequencies that correspond to bins that are immediately adjacent, one having one bin number lower than and another having one bin number higher than the bin found in task 120. A task 122 will then place the frequencies that correspond to these adjacent bins into scanning unit list 76. A query task 124 determines if scanning unit list 76 has been completely reviewed, or if there are still other frequencies 92 that must be processed. If there are additional frequencies 92, then task 104 will be called again. If there are no more frequencies 92, task 126 terminates this adjacent bin extension process. Although the above discussion mentions extending the frequency ranges only by a single bin, it should be noted that this extension of frequencies can extend to multiple bins in either direction, depending upon the frequency range of each bin.

Returning to FIG. 3, once a valid scanning unit list 76 exists, transmitter 32 receives scanning unit list 76 from scanning unit 86 in a task 128.

Then, in a task 130, second radio communication unit 26 obtains the third list of frequencies, restricted frequency list 78. This list of frequencies indicates which frequencies should not be used for transmission. A sample restricted frequency list 78 can be seen in FIG. 11. There are many frequencies that are regulated and restricted by the government for special uses, such as emergency channels. These channels are reserved for use only by specific entities that have been licensed by the government to exclusive use of those frequencies. As these frequencies are already known, they can be organized into restricted frequency list 78 and programmed into or transmitted to any device as needed. Restricted frequency list 78 is nearly static. But, by occasionally transmitting this list, and ensuring that all devices are aware of the frequencies that are deemed restricted, the range of restricted frequencies can be adapted and modified as needed, without worry that other devices may be adversely affected by the change.

Due to the special nature of restricted frequencies 132, regardless of whether frequencies 132 are currently being used or not, second radio communication unit 26 (FIG. 1) is not permitted to use frequencies 132. Restricted frequency list 78 may be provided to radio communication unit 22 in a number of ways, including having it wired into second unit 22 at the time of manufacture, or received wirelessly by second unit 22. Second unit 22 may also be programmable such that frequencies 132 found in restricted list 78 may be modified and updated if necessary.

Although FIG. 3 shows second radio communication unit 26 acquiring receiving unit list 50 first, then scanning unit list 76, and finally restricted frequency list 78, it should be noted that all three of these lists may be acquired simultaneously, or in a different order.

After all three lists are obtained by second radio communication unit 26, the frequency information contained in the lists is passed to attenuation unit 64 (FIG. 5). Attenuation unit 64 adjusts the values held by some frequency bins 74 in order to reduce the amount of interference encountered by reception signal processing circuitry 38 at the unit 22 receiving signal 42 from radio communication unit 22 and the amount of interference second radio communication unit 26 causes for other devices 28. This is done by modifying the values held in specific frequency bins 74 to prevent signal 44 from being transmitted in frequencies that are listed in one of the three lists obtained in the previous tasks.

A task 134, performed by attenuation unit 64 (FIG. 5), combines the frequency information contained in scanning unit list 76, receiving unit list 50 and restricted frequency list 78 into an attenuation unit list 136.

Figure 11:
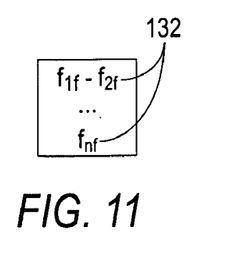
FIG. 11 shows a list of restricted frequencies in accordance with a preferred embodiment of the present invention.
Figure 12:
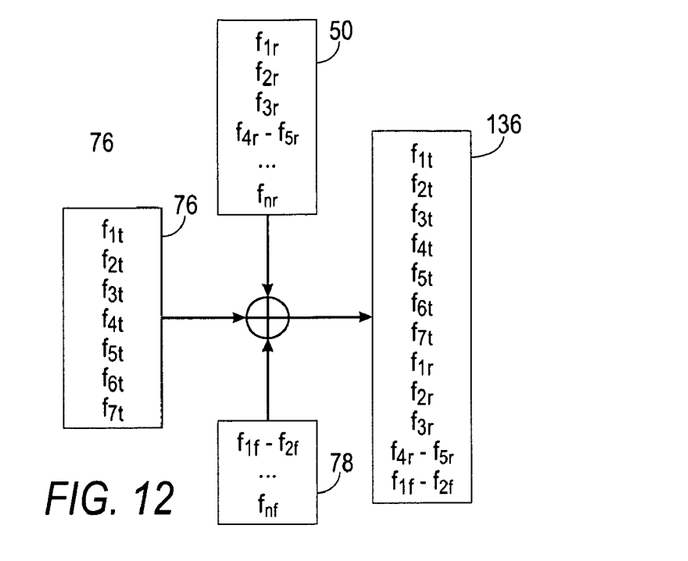
FIG. 12 graphically shows an example of an attenuation unit combining more than one frequency list into one frequency list in accordance with a preferred embodiment of the present invention.

FIG. 12 shows how attenuation unit 64 (FIG. 5) creates attenuation unit list 136. Attenuation unit 64 reads scanning unit list 76 (FIG. 7), receiving unit list 50 (FIG. 4) and restricted frequency list 78 (FIG. 11). Attenuation unit 64 creates attenuation unit list 136 from frequencies that are found in the lists, such that all frequencies and frequency ranges that have been described in the lists are included.

Once task 134 has completed, attenuation unit 64 (FIG. 8) performs a task 138. Task 138 uses attenuation unit list 136 to modify frequency bins 74 (FIG. 6) received from channelizer 62 (FIG. 5). This modification is done by placing a notch (discussed below) in every bin 74 that contains a frequency found in attenuation unit list 136. In one embodiment, placing the notch will simply zero the values held in specific frequency bins 74 (FIG. 9) identified by attenuation unit list 136. In an alternative embodiment, the notch will substantially reduce the values held in the identified frequency bins 74.

Figure 13:
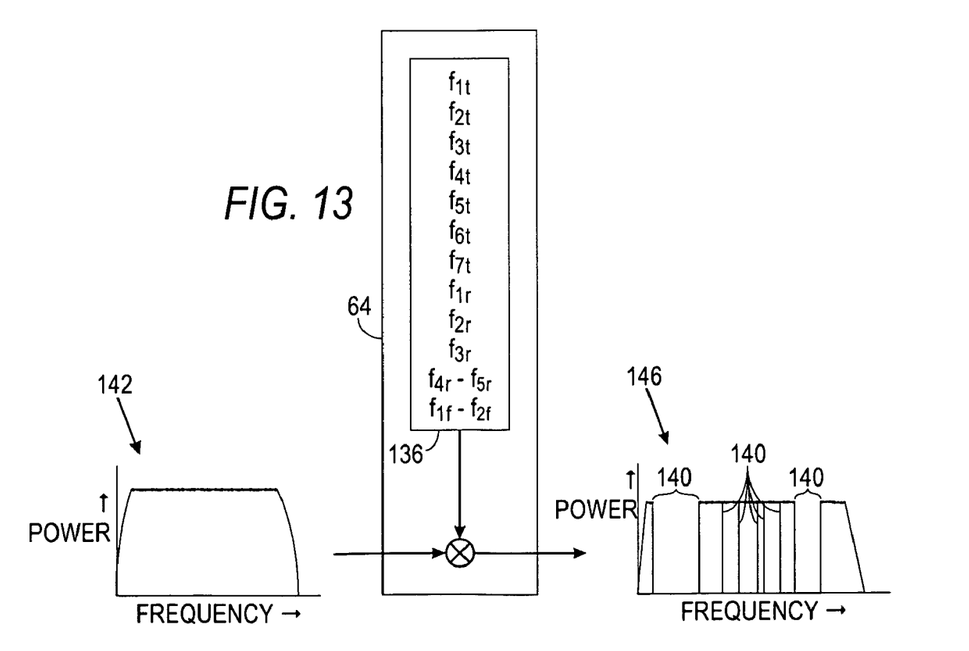
FIG. 13 graphically shows an operation of an attenuation unit within a transmitter in accordance with a preferred embodiment of the present invention.

FIG. 13 shows attenuation unit 64 within transmitter 32 (FIG. 2). The input to attenuation unit 64 is a set of frequency bins 74 (FIG. 6) such that, if the information contained in frequency bins 74 were plotted, the result can be seen as frequency plot 142. A notch 140 is placed in each frequency bin 74 that contains frequencies that exist in attenuation unit list 136. Once notches 140 are placed in all frequency identified bins 74, attenuation unit 64 will output a set of frequency bins 144 (FIG. 5). If the information contained in output frequency bins 144 were plotted, the resulting plot might resemble sample output frequency plot 146. Notches 140 have been placed in the spectrum depicted in plot 142 as indicated by attenuation unit notch list 136.

Returning to FIG. 3, after attenuation unit 64 has completed task 138, frequency bins 144 are passed to dechannelizer 66 (FIG. 5) to complete a task 148. In task 148, dechannelizer 66 converts frequency bins 144 from a frequency-domain signal into time-domain signal 42 using conventional Inverse Fourier Transformation techniques.

A task 150 then adjusts the power used to transmit signal 44. This is done in power adjustment unit 68. Once second radio communication unit 26 is aware that it has not been using sufficient power to ensure that signal 42 is successfully communicated to another device, power adjustment unit 68 will increase the power to ensure successful communication. Similarly, if second radio communication unit 26 is notified that it can reduce the amount of power used to transmit signal 42 while still achieving a successful communication, power adjustment unit 68 will reduce the power used to transmit.

Although power adjustment unit 68 is shown as connected between dechannelizer 66 and antenna 30, one skilled in the art will recognize that power adjustment can occur at any stage within transmitter 32.

After the power in signal 42 has been adjusted, a task 152 is performed. In this task, antenna 30 (FIG. 2) transmits signal 42 wirelessly.

Although the above discussion has assumed that radio communication unit 22 (FIG. 2) has both receiver 34 and transmitter 32, other embodiments may also exist.

Figure 14:
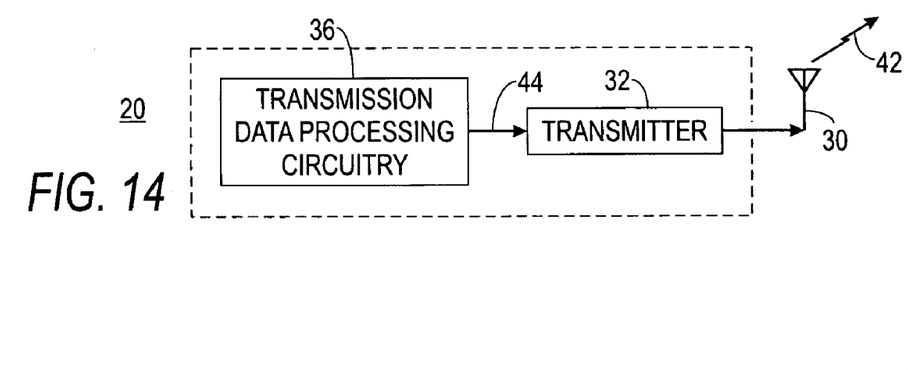
FIG. 14 shows a simplified block diagram of a radio communication unit in an alternative preferred embodiment of the present invention.

FIG. 14 shows an alternative embodiment of radio communication unit 22. In this embodiment, radio communication unit 22 is configured to solely transmit signal 42. Transmission data processing circuitry 36 will generate signal 44 and pass signal 44 to transmitter 32. After further processing in transmitter 32, the output signal 42 will be passed to antenna 30 for transmission.

Figure 15:
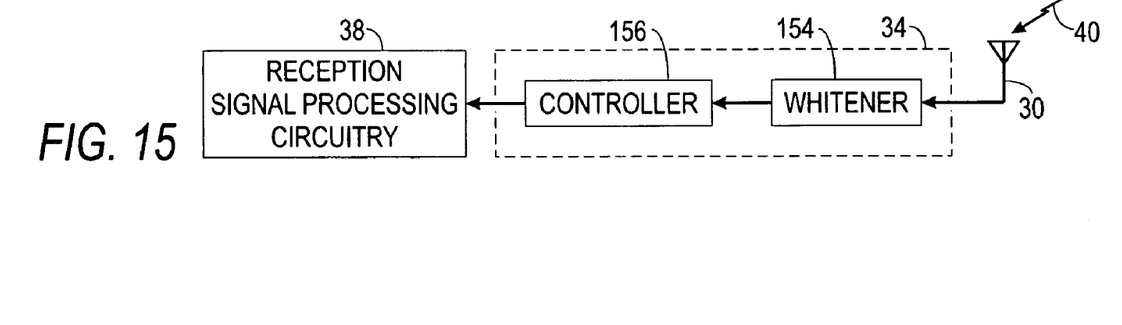
FIG. 15 shows a simplified block diagram of a receiver within a radio communication unit in accordance with a preferred embodiment of the present invention.

FIG. 15 shows a simplified block diagram of receiver 34 in radio communication unit 22. Receiver 34 is made up of a whitener 154 and a controller 156. When signal 40 is received by antenna 30, interference from many different sources, including other devices 28, is likely. This interference will affect the quality of received signal 40, as some frequency components of received signal 40 will be masked by this interference. Whitener 154 is used to reduce this noise and interference that exists in signal 40. Whitener 154 can do this in many different ways, including normalizing the power levels by multiplying the power at each frequency by the inverse square root of the overall power of signal 40. Another method of reducing the distortion can be by estimating signal's 40 spectrum by computing the difference of the received spectrum from the ideal spectral form of a square-root raised cosine signal. Still another method of reducing the distortion is multiplying the power in each frequency bin 74 by the power of signal 40. This method reduces the length of the RAKE receiver needed to create a proper filter for signal 40. These and other methods practiced known to those skilled in the art may be practiced by whitener 154.

Subsequent to reducing the noise and interference in signal 40, controller 156 compares the power level of interference mitigated signal 40 to power threshold 52 (FIG. 4). If the power level of signal 40 is above threshold 52, controller 156 places the frequency at which the power level is above threshold 52 into list 50 (FIG. 5). Although this list-making process is done in a component outside of whitener 154, this process may also be done within whitener 154, if desired. Also, the function of whitener 154 may be carried out in a DSP, controller 156, or other similar component.

After list 50 is created, the noise-reduced version of signal 40 is passed to reception signal processing circuitry 38 for any further processing as desired.

Figure 16:
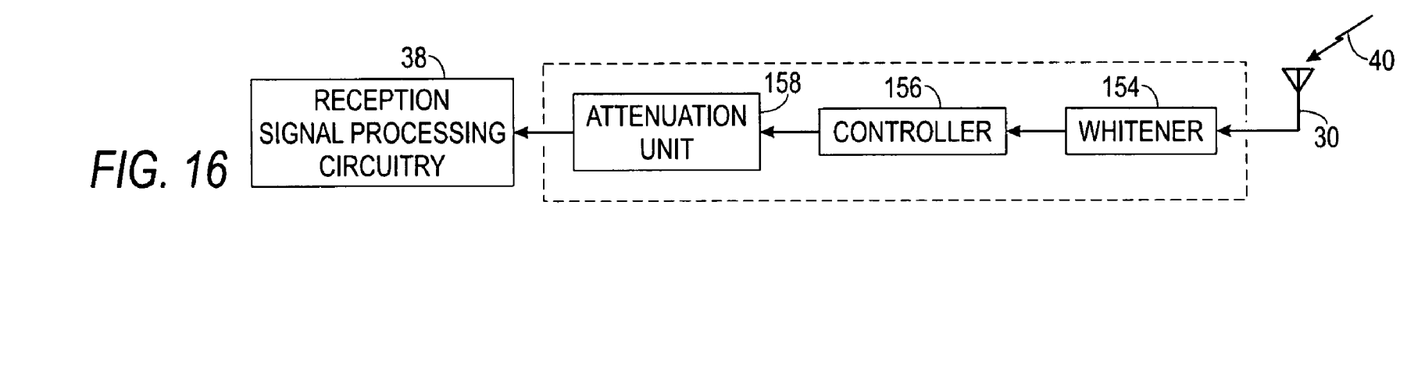
FIG. 16 shows a simplified block diagram of a receiver within a radio communication unit in accordance with an alternative preferred embodiment of the present invention.

FIG. 16 is an alternative embodiment of a simplified block diagram of receiver 34 in radio communication unit 22. In this embodiment, receiver 34 has an attenuation unit 158 in addition to whitener 154. Attenuation unit 158 in receiver 34 performs a function similar to attenuation unit 64 (FIG. 5) in transmitter 32 (FIG. 5). In receiver 34, attenuation unit 158 will use the frequencies 54 (FIG. 4) determined by controller 156 to have power levels above power threshold 52 (FIG. 4), and create receiving unit list 50 (FIG. 4). Receiving unit list 50 is used by attenuation unit 158 to determine which frequencies 54 will be ignored when recovering transmitted signal 42 from received signal 40. Similar to attenuation unit 64 in transmitter 32, attenuation unit 158 in receiver 34 may zero received signal 40 for all frequencies 54 found in receiving unit list 50. In another embodiment, attenuation unit 158 substantially reduces signal 40 for all frequencies 54 found in receiving unit list 50 such that the negative impact of frequencies 54 on the successful demodulation of signal 40 is attenuated.

In summary, the present invention teaches a radio unit that notches transmission frequency bins to improve performance of signal transmission and reception. Unlike traditional radio communication devices, radio communication unit 22 is configured to determine transmission frequencies having minimal interference, and transmit in those frequencies. Therefore, any processing, including the use of a matched filter, once the signal is received will be focused in frequencies that will likely not be interfered with and not likely to cause interference with other users of transmission band 88.

Interference within transmission band 88 is determined at transmitting device 26. Transmitting device 26, through periodic scans, monitors its transmission band 88, and adapts signal 42 to transmit in frequencies with minimal interference.

Reception interference is determined at the receiving device 24, and sent to the transmitting device 26 so that the effect of local interference at the receiving device 24 is also minimized. By doing so, the potential for rejecting the signal 40 at frequencies containing data transmitted by transmitting device 26 as interference is minimized, as transmission will not occur in frequencies with interference above a threshold 52 determined by receiving unit 24.

Due to the process of avoiding transmission in frequencies with high levels of interference, power waste is minimized. Instead, substantially all transmit power is focused in frequencies that have minimal interference, which results in an overall reduced amount of power necessary to ensure that the signal is received by receiving device 24. By doing this, transmitting device 26 is able to extend battery reserves and generally reduce the interference in the full frequency spectrum. This is due to the fact that minimal power is used, and minimal power will be wasted by boosting power and trying to successfully transmit signal 42 in frequencies having high interference. Because of the lack of transmission in frequencies having interference, transmitting device 26 also refrains from increasing the interference in those frequencies. By periodically scanning frequency bands and adaptively determining which frequencies should not be transmitted in, transmitting devices can reduce the amount of power necessary to transmit signals that are received by receiving device 86.

By using an adaptive transmission spectrum, radio communication devices 22 can better utilize the limited frequency bands available. Rather than trying to overpower other neighboring devices in a limited number of frequencies, radio communication devices 22 can adaptively determine which frequencies are currently in use in its locality, and transmit in frequencies that are not currently in use.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A radio unit comprising:
a receiver configured to receive a wireless signal which communicates a set of frequency identities corresponding to frequencies that exhibit power levels above a preset power threshold at a location remote to said radio unit;
a transmitter comprising:
a channelizer configured to accept a signal and output a first set of frequency bins formed from said signal;
an attenuation unit connected to said channelizer, said attenuation unit configured to accept said first set of frequency bins as an input, place a notch in one of said first frequency bins corresponding to one of said frequency identities from said set of frequency identities, and output a second set of frequency bins, said second set of frequency bins including said one of said frequency bins with said notch;
a dechannelizer connected to said attenuation unit, said dechannelizer configured to accept said second set of frequency bins and generate a second signal; and
an antenna configured to transmit said second signal.

2. A radio unit as claimed in claim 1 wherein said radio unit is a secondary user of a spectrum and said radio unit further comprises:
a signal spectrum scanning unit connected to said attenuation unit, said signal spectrum scanning unit being configured to scan a transmission band at said radio unit for a frequency at which signal energy is above a predetermined threshold.

3. A radio unit as claimed in claim 2, wherein:
said notch is a first notch; and
said scanning unit drives said attenuation unit to place a second notch in said one of said first set of frequency bins corresponding to said frequency having signal energy above said predetermined threshold.

4. A radio unit as claimed in claim 3 wherein:
said attenuation unit places an additional notch in at least one of said first set of frequency bins having a frequency adjacent to and lower than said one of said first set of frequency bins with said second notch.

5. A radio unit as claimed in claim 3 wherein:
said attenuation unit places an additional notch in at least one of said first set of frequency bins having a frequency adjacent to and higher than said one of said first set of frequency bins with said second notch.

6. A radio unit as claimed in claim 3 wherein said attenuation unit additionally places a notch in one of said first set of frequency bins that corresponds to one of a set of restricted frequencies.

7. A radio unit as claimed in claim 1 wherein said receiver comprises a whitener.

8. A radio unit as claimed in claim 1 wherein said second signal is modulated using Direct-Sequence Spread Spectrum (DSSS) modulation techniques.

9. A radio unit as claimed in claim 1 wherein said channelizer is a poly-phase filter.

10. A radio unit which is a secondary user of a spectrum, said radio unit comprising:
a transmitter comprising:
a channelizer configured to accept a signal and output a first set of frequency bins formed from said signal;
a signal spectrum scanning unit, said signal spectrum scanning unit being configured to scan a transmission band of said radio unit for a frequency at which signal energy is above a predetermined threshold;

an attenuation unit connected to said channelizer and said signal spectrum scanning unit, said attenuation unit configured to accept said first set of frequency bins as an input, in response to said signal spectrum scanning unit place a notch in one of said frequency bins corresponding to said frequency having signal energy above said predetermined threshold, and output a second set of frequency bins, said second set of frequency bins including said one of said frequency bins with said notch, wherein said notch is configured to remain for a predetermined period of time after said signal energy falls below said predetermined threshold;

a dechannelizer connected to said attenuation unit, said dechannelizer configured to accept said second set of frequency bins and generate a second signal; and an antenna configured to transmit said second signal.

11. A radio unit as claimed in claim 10 wherein said predetermined period of time which said notch is configured to remain is longer when said signal conveys data communication than when said signal conveys voice communication.

12. A method of communicating between a first radio communication unit and a second radio communication unit, wherein said first radio communication unit and second radio communication unit are users of a signal spectrum, said method comprising:

establishing a network wherein said first radio communication unit and said second radio communication unit communicate;

receiving a signal at said first radio communication unit;

determining from said received signal frequencies at which power levels are above a preset power threshold at said first radio communication unit;

transmitting from said first radio communication unit to said second communication unit a list of said frequencies having power levels above said preset threshold;

receiving said list of said frequencies at said second radio communication unit;

placing a notch in one of a set of frequency bins corresponding to a frequency found in said list;

creating a time-domain signal from said frequency bins; and transmitting said time-domain signal from said second radio communication unit to said first radio communication unit using a transmission band;

wherein said time-domain signal avoids transmitting at said frequencies found in said list.

13. A method as claimed in claim 12 wherein said time-domain signal is modulated using DSSS modulation techniques.

14. A method as claimed in claim 12, wherein said second radio communication unit is a secondary user of said signal spectrum, and said method further comprises:

periodically scanning a transmission band at said second radio communication unit;

adaptively determining, from said scanning of said transmission band, a frequency having a signal energy level above a preset energy threshold; and placing a notch in one of a set of frequency bins corresponding to said frequency having a signal energy level above; said preset energy threshold.

15. A method as claimed in claim 14 wherein said time-domain signal is modulated using DSSS modulation techniques.

16. A method as claimed in claim 12 further comprising:

placing at said second radio communication unit a notch in one of a set of frequency bins corresponding to a frequency from a set of restricted frequencies.

17. A method as claimed in claim 16 wherein said time-domain signal is modulated using DSSS modulation techniques.

18. A method as claimed in claim 12 wherein:

said second radio communication unit is one of a plurality of radio communication units to which said first radio communication unit is linked; and said plurality of radio communication units each receive said list from said first radio communication unit.

19. A method of communicating between a first radio communication unit and a second radio communication unit, wherein said first radio communication unit is a user of a signal spectrum and said second radio communication unit is a secondary user of said signal spectrum, said method comprising:

establishing a network wherein said first radio communication unit and said second radio communication unit communicate;

receiving a signal at said first radio communication unit;

determining from said received signal frequencies at which power levels are above a first preset power threshold at said first radio communication unit; and transmitting from said first radio communication unit to said second communication unit a list of said frequencies having power levels above said first preset power threshold;

periodically scanning a transmission band for said second radio communication unit;

adaptively determining, from said scanning of said transmission band, a frequency having a signal energy level above a second preset power threshold;

placing a notch in one of a set of frequency bins corresponding to said frequency having a signal energy level above said second preset power threshold, wherein said notch is configured to remain for a preset period of time after said signal energy level falls below said second preset power threshold;

creating a time-domain signal from said frequency bins; and transmitting said time-domain signal using said transmission band from said second radio communication unit to said first radio communication unit;

wherein said one of a set of frequency bins with said notch causes said time-domain signal to avoid transmitting at said frequency having said signal energy level above said second preset power threshold.

20. A method of communicating between a base station and a subscriber unit, wherein said base station and said subscriber unit are secondary users of a signal spectrum, said method comprising:

establishing a network wherein said base station and said subscriber unit communicate;

receiving a signal at said base station;

determining from said received signal frequencies at which power levels are above a preset power threshold at said base station;

transmitting from said base station to said subscriber unit a list of said frequencies at which said power levels are above said preset power threshold;

receiving said list at said subscriber unit;

setting a first notch in one of a set of frequency bins which corresponds to a frequency found in said list, at said subscriber unit;

setting a second notch in one of said set of frequency bins which corresponds to a second frequency identified from a set of restricted frequencies;

periodically scanning a transmission band of said subscriber unit for a frequency having signal energy levels above a preset signal energy level at said subscriber unit;

setting a third notch in one of said set of frequency bins which corresponds to a third frequency having a signal energy level above said preset energy level;

creating a time-domain signal from said set of frequency bins; and transmitting said time-domain signal from said subscriber unit to said base station using said transmission band.

21. A method as claimed in claim 20 wherein said time-domain signal is modulated using DSSS modulation techniques.

* * * * *